UNITED STATES PATENT OFFICE.

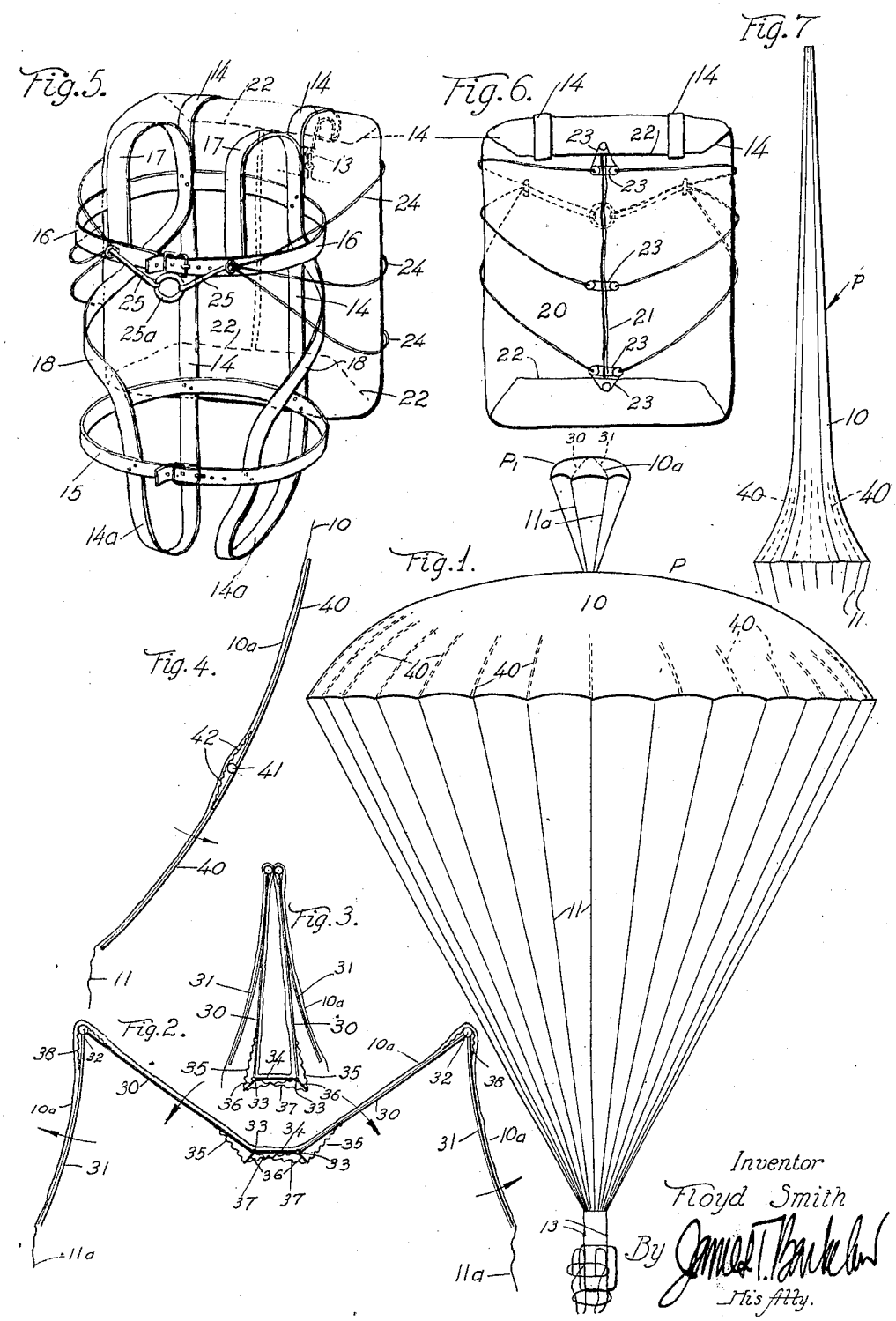

FLOYD SMITH, OF SAN DIEGO, CALIFORNIA, ASSIGNOR TO FLOYD SMITH AERIAL EQUIPMENT COMPANY, A CORPORATION OF ILLINOIS.

PARACHUTE.

1,340,423.      Specification of Letters Patent.      Patented May 18, 1920.

Application filed July 27, 1918. Serial No. 246,999.

*To all whom it may concern:*

Be it known that I, FLOYD SMITH, a citizen of the United States, residing at San Diego, in the county of San Diego, State of California, have invented new and useful Improvements in Parachutes, of which the following is a specification.

This invention relates to parachutes and parachute paraphernalia; and particularly to parachutes adapted to be used by aviators for life saving purposes. It is an object of this invention to provide a parachute apparatus which is simple in construction, light in weight and effective and dependable in action. It is particularly an object of this invention to provide a dependable means for causing the straightening out and opening of the parachute under all conditions, including certain conditions under which the present type of parachute is totally inoperative or deficient in operation. Parachutes are now carried in shoulder packs carried upon the back of an aviator and are adapted to be released by tearing or opening the pack and adapted to be extended by air resistance or by the top of the parachute being attached to the airplane by a cord which will break when fully extended. But this type of parachute has a decided disadvantage in that it depends upon the aviator being able to jump and drop away from the airplane in order to extend the parachute and cause it to open. If the airplane is falling and the aviator cannot get away from it he may then merely fall with the plane.

A feature of my invention which overcomes the above mentioned difficulty is the use of a small automatically operating parachute to be used as a means for relatively anchoring or holding the upper end of the main parachute to extend the main parachute and thus cause it to properly open. I provide a small auxiliary parachute having ribs which are resiliently operated in some manner so as to automatically open when the parachute is released from the pack. This small parachute will catch the air and will extend the main parachute, if the aviator is either falling through the air along or falling with his machine. If he is falling with his machine the main parachute will lift him off the machine when it opens.

The invention will be best understood from the following detailed description of a preferred form of apparatus, etc., reference for this purpose being had to the accompanying drawings in which Figure 1 is an elevation showing the parachute apparatus as it will appear in use; Fig. 2 is a sectional view of the small auxiliary parachute partially opened; Fig. 3 is a view of the auxiliary parachute closed; Fig. 4 is a detailed view showing a spring rib which may be incorporated in the large parachute for the purpose of causing it to flare at its lower edge to catch the air; Fig. 5 is a perspective of a form of pack and harness which may be used with my device; Fig. 6 is a rear elevation of the same; and Fig. 7 is a view showing how the large parachute hangs when extended.

In Fig. 1 I show the main parachute P which may be of any usual construction with its fabric body 10 and its cords 11, the lower ends of cords 11 being attached at 13 to the harness. This harness may be constructed in any suitable manner. For instance, there may be a pair of main back straps 14 which extend downwardly and at 14$^a$ extend forwardly and around the wearer's legs and then upwardly to a belt strap 15. A chest strap 16 may also be used which is secured to the back straps 14; and shoulder straps 17 extend over the wearer's shoulders; while straps 18 extend diagonally from the belt strap to the shoulder straps. The harness is made to support the wearer securely and strongly from the straps 14, the upper ends of which are provided with snaps or hooks as indicated at 13 to engage with the parachute cords or other parts.

The back of the harness carries a pack 20 of some fabric material, the sides of which are folded over and meet along the center of the back of the pack at 21 and the ends of which may be folded over in any suitable manner under or over the folded sides as indicated at 22. The folded sides are held together by any suitable releasable means. For instance these folded sides, and ends, may be held together by a thread tie or loop as indicated at 23; and then to the edges of these folded sides cords 24 may be attached, the cords being of sufficient strength to cause loops to be broken when the wearer pulls on these cords. These cords may be extended around to the front of the harness where they may be run together or attached to a single strap or any other member as indicated at 25 which may be extended across the wearer's breast, with a central ring 25ª or other handle easy for the wearer to grasp. A pull upon the handle 25ª will cause the thread ties of the pack to break and will allow the pack to open. The parachutes are carried folded in this pack; and upon release of the pack the parachutes will then be released and the small auxiliary parachute will be allowed to open. This small auxiliary parachute P¹ has a fabric body 10ª and has its cords 11ª attached to the top of the fabric body 10 of the main parachute P. Parachute P¹ is constructed as is best illustrated in Figs. 2 and 3 with ribs 30, 31, hinged together at 32. The top ribs 30 are pivoted at 33 to a member 34 which forms a sort of top plate or disk about which the ribs 30 are placed. There may be any suitable number of the ribs 30, 31; two or three may suffice but it is preferable to have more. Each rib 30 is provided with a resilient or spring element 35 stretched between a point on the rib and a post 36 which is mounted on the underside of member 34, this post being preferably braced by a tension brace as shown at 37. Or the post 36 may also be pivoted at 33, as is shown in the drawings, and the members 37 may also be resilient. This construction may be varied in any manner to provide a means for causing the ribs 30 to move relatively to the plate 34 as indicated by the arrows in Fig. 2. Furthermore there are also means provided at 38 for causing relative movement of ribs 31 outwardly in the direction indicated by the arrows in Fig. 2; these means may also be rubber bands or springs or the like. The fabric body 10ª is extended over the frame work formed by these ribs. The device is folded to the position shown in Fig. 3, with the ribs 30 and 31 folded alongside each other and the lower ends of ribs 31 brought in toward the top plate 34. (Fig. 3 does not show the ribs in their most compact position, which is attained when ribs 31 are moved farther inwardly and held flat against ribs 30, and which is the position of the ribs when held in the pack. Fig. 3 shows the parachute still folded but in the first position it assumes on being released from the pack.) Folded in such a manner as here described this parachute is comparatively small, and the length of the folded bundle made by it need not exceed 12 or 16 inches. The ribs are preferably made of resilient metal or wood, so that although they may be folded flatly against each other, and although the ribs 31 may normally have an outward curvature as is indicated in Figs. 2 and 3 in order to give a flare or spread to the lower edge of the parachute, yet the ribs will take the general curvature of this fabric body of the parachute when the parachute is in action in the air. The slight normal curvature of ribs 31 tends to initially flare the lower edge of the small parachute immediately upon release.

When folded in the pack the small auxiliary parachute is placed above the bundle formed by the large parachute; and the small parachute is preferably folded with its cords underneath it and in such relation to the cords of both chutes that it cannot become entangled with them when it is released. Immediately the pack is torn open then the small parachute springs open and immediately catches the air (the aviator having opened the pack either while he is standing on the falling machine or after he has jumped away from the machine). The small parachute immediately catches the air and pulls the large parachute out of the pack and straightens it into proper position. In this position the large parachute will usually catch the air without fail and then immediately open. However in order to make sure of the large parachute catching the air I may provide its lower edge with ribs (any number may be used spaced around the lower edge) as indicated at 40 and as shown in detail in Fig. 4. Here I show two rib portions 40 hinged together at 41 and a rubber or other member at 42 attached to the two rib portions and arranged so as to spread them apart. When folded the rib portions shown below, in Fig. 4, are folded around in the direction indicated by the arrow against the other parts. These ribs are also preferably made of spring material and are made so as to normally have a curvature tending to flare the lower edge of the main parachute to cause it to more quickly and surely catch the air. Fig. 7 shows how the parachute hangs with its lower edge flared. If so desired, the ribs may be arranged between cords 11 rather than in line with them; so that the ribs may expand and flare the edge of the parachute between the ends in spite of the downward pull tending to hold the parachute edge down. It will be seen the action of the small auxiliary parachute is to straighten the large chute out so as to put it in its best position to take the air. The small chute is small enough so that even without an automatically opening means it may under some circumstances take the air upon being released from the pack, or upon being pulled out of the pack by the aviator; and then cause the large chute to be pulled out. But the automatically opening means causes the small chute to infallibly operate without any special attention on the part of the aviator.

Having now described a preferred form of my invention, I claim:

1. In combination, a parachute folded into a compact mass and having suspending members, a sheet of flexible material folded about said parachute and permitting the ends of said suspending members to project, releasable fastening means between each edge of the sheet and some other portion of the sheet, a releasing device, and means connecting said fastening means to said releasing device.

2. In combination, a parachute folded into a compact mass, a sheet of flexible material folded about said parachute, releasable fastening means between each edge of the sheet and some other portion of the sheet, a releasing cord for said fastening means, and a guide for said cord.

3. In combination, a parachute folded into a compact mass, a sheet of flexible material folded about said parachute, a series of releasable fastening devices for retaining the sheet in its folded condition, and a releasing device extending from said fastening means to a remote point.

4. In combination, a parachute folded into a compact mass and having a suspending member, a sheet of flexible material folded about said parachute and leaving the free end of said member projecting therefrom, a series of releasable fastening means for securing said sheet in its folded condition, a body harness connected to said suspending member, and a releasing device associated with said fastening means and extending to the front of said harness.

5. In combination, a parachute folded into a compact mass, a sheet of flexible material folded about said parachute so as to bring all of its edges on the rear side of the pack so formed, a series of releasable fastening means on the rear side of said pack for maintaining the same in its assembled condition, a body harness arranged on the front side of the pack, a connection extending from the harness into the pack to the parachute, and a releasing device for said fastening means.

6. In combination, a parachute folded into a compact mass, a sheet of flexible material folded about said parachute so as to bring all of its edges on the rear side of the pack so formed, a series of releasable fastening means on the rear side of said pack for maintaining the same in its assembled condition, a body harness arranged on the front side of the pack, a connection extending from the harness into the pack to the parachute, and a releasing device for said fastening means extending to a point at the front of the harness.

7. In combination, a parachute folded into a compact flat rectangular mass, a sheet of flexible material folded around the parachute and having its edges disposed on one of the larger sides, releasable fastening means arranged on the latter side to hold the sheet securely in its folded condition, a body harness arranged on the opposite side of the pack from that on which the fastening means are located, a connection between said harness and said parachute, and a releasing device for said fastening means.

8. In combination, a parachute folded into a compact flat rectangular mass, a sheet of flexible material folded around the parachute and having its edges disposed on one of the larger sides, releasable fastening means arranged on the latter side to hold the sheet securely in its folded condition, a body harness arranged on the opposite side of the pack from that on which the fastening means are located, a connection between said harness and said parachute, and a releasing device extending from said fastening means to a point at the front of said harness.

9. In combination, a parachute folded into the form of a flat rectangular mass, a sheet of flexible material folded about said mass and having its four edges disposed on one of the broader sides, releasable fastening means securing each edge of the sheet to an adjacent part of the sheet, a body harness lying on the side of the enveloped parachute opposite to that on which the fastening means are located, a connection between the harness and the parachute, and a releasing device extending from said fastening means to a point on the harness.

10. In combination, a parachute folded into a compact mass and having suspending members, a sheet of flexible material folded about said parachute and permitting the ends of said flexible member to project, releasable fastening means between each edge of the sheet and some other portion of the sheet, and means for simultaneously releasing said fastening means and drawing back portions of the sheet to expose the parachute.

11. In combination, a parachute folded into a compact mass and having suspending members, a sheet of flexible material folded about said parachute and permitting the ends of said suspending members to project, a body harness attached to the central portion of said sheet, releasable fastening means between each end and side edge of the sheet and some other portion of the sheet, and means for simultaneously releasing said fastening means and drawing the sides of the sheet into the plane of said central portion so as to expose the parachute.

12. In combination, a parachute folded into a compact mass and having suspending members, a sheet of flexible material folded about said parachute and permitting the ends of said suspending members to project, a body harness attached to the central portion of said sheet, releasable fastening means between each end and side edge of the sheet and some other portion of the sheet, means for simultaneously releasing said fastening means and drawing the sides of the sheet into the plane of said central portion so as to expose the parachute, and a small pilot parachute attached to the apex of the aforesaid parachute.

13. In combination, a parachute folded into a compact mass and having suspending members, a small pilot parachute attached to the apex of the aforesaid parachute, a sheet of flexible material folded around said parachutes and permitting the ends of said suspending members to project, releasable fastening means between each edge of the sheet and some other portion of the sheet, and a releasing device extending from said fastening means to a remote point.

14. The combination with a parachute folded into a compact, flat, rectangular mass, of a sheet of flexible material folded about and inclosing the same, the edges of the sheet all lying on the same side of the package thus formed, each edge of the sheet overlapping the opposed edge and at least one other edge of the sheet so as to form a complete closure, releasable fastening means for holding the edges of the sheet against displacement, and a pull cord connected with said fastening means to release the same.

In witness that I claim the foregoing I have hereunto subscribed my name this 25th day of July 1918.

FLOYD SMITH.

Witnesses:
 WM. E. DONSON,
 H. A. HICKS.